United States Patent
Lee et al.

(10) Patent No.: US 11,858,442 B2
(45) Date of Patent: Jan. 2, 2024

(54) APPARATUS FOR PROTECTING PASSENGER IN VEHICLE AND CONTROL METHOD THEREOF

(71) Applicant: HYUNDAI MOBIS CO., LTD., Seoul (KR)

(72) Inventors: Cheol Woo Lee, Yongin-si (KR); Byung Su Kim, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 309 days.

(21) Appl. No.: 17/349,847

(22) Filed: Jun. 16, 2021

(65) Prior Publication Data

US 2022/0306027 A1    Sep. 29, 2022

(30) Foreign Application Priority Data

Mar. 26, 2021 (KR) .................. 10-2021-0039547

(51) Int. Cl.
*B60R 21/0134* (2006.01)
*B60R 11/04* (2006.01)
(Continued)

(52) U.S. Cl.
CPC .......... *B60R 21/0134* (2013.01); *B60R 11/04* (2013.01); *B60R 21/013* (2013.01);
(Continued)

(58) Field of Classification Search
CPC .......... B60R 21/0134; B60R 21/01512; B60R 11/04; B60R 21/013; B60R 21/16; B60R 22/00; B60R 2011/0003
See application file for complete search history.

(56) References Cited

U.S. PATENT DOCUMENTS

2001/0054816 A1* 12/2001 Brambilla .......... B60R 21/01558
                                                     280/806
2007/0168128 A1    7/2007 Tokoro et al.
(Continued)

FOREIGN PATENT DOCUMENTS

JP    2012-001125    1/2012
KR    10-1655569     9/2016

OTHER PUBLICATIONS

Korean Office Action dated Nov. 15, 2022 issued in KR 10-2021-0039547.
(Continued)

*Primary Examiner* — Gertrude Arthur Jeanglaude
(74) *Attorney, Agent, or Firm* — DLA PIPER LLP (US)

(57) ABSTRACT

An apparatus for protecting a passenger in a vehicle and a control method thereof. The apparatus includes a collision detection unit that detects a predicted collision state and a collision state of a vehicle; a seat belt driving unit that adjusts tension of a seat belt according to an operation mode; an airbag driving unit that deploys each of a plurality of airbags according to a driving signal; a capturing unit that captures images of an interior of the vehicle; an image processing unit that extracts passenger information by processing images inputted from the capturing unit; and a control unit that recognizes a passenger type and a seating position based on the passenger information, operates the seat belt driving unit by setting the operation mode, adjusts deployment time points of the plurality of airbags, and outputs the driving signal to the airbag driving unit.

20 Claims, 6 Drawing Sheets

(51) Int. Cl.
  *B60R 21/013* (2006.01)
  *B60R 21/16* (2006.01)
  *B60R 22/00* (2006.01)
  *B60R 21/015* (2006.01)
  *B60R 11/00* (2006.01)

(52) U.S. Cl.
  CPC ........ *B60R 21/01512* (2014.10); *B60R 21/16* (2013.01); *B60R 22/00* (2013.01); *B60R 2011/0003* (2013.01)

(56) References Cited

U.S. PATENT DOCUMENTS

| | | | |
|---|---|---|---|
| 2008/0228349 A1* | 9/2008 | Nakamura | B60R 21/01538 701/33.4 |
| 2018/0236907 A1* | 8/2018 | Ohno | B60N 2/0276 |
| 2018/0281730 A1* | 10/2018 | Nagasawa | B60N 2/75 |
| 2019/0299897 A1* | 10/2019 | Gramenos | B60N 2/4235 |
| 2019/0359169 A1 | 11/2019 | Schutera | |

OTHER PUBLICATIONS

Chinese Office Action dated May 26, 2023 issued in CN 202110698585.

* cited by examiner

APPARATUS FOR PROTECTING PASSENGER IN VEHICLE AND CONTROL METHOD THEREOF

CROSS-REFERENCE TO RELATED APPLICATION

This application claims priority from and the benefit of Korean Patent Application No. 10-2021-0039547, filed on Mar. 26, 2021, which is hereby incorporated by reference for all purposes as if set forth herein.

BACKGROUND

Field

Exemplary embodiments of the present disclosure relate to an apparatus for protecting a passenger in a vehicle and a control method thereof, and more particularly, to an apparatus for protecting a passenger in a vehicle and a control method thereof, which recognize the type and position of a passenger by processing interior images of the vehicle based on deep learning, optimize an operation mode of an active seat belt and deployment time points of airbags according to the type and position of the passenger from the time point at which a collision is predicted, and operate the airbags.

Discussion of the Background

Recently, as the commercialization of an advanced driver assistance system mounted in a vehicle is being actively conducted with the development of various sensors and recognition systems, vehicle safety systems are evolving from passive systems such as airbags and seat belts to active systems such as forward collision avoidance systems and lane keep assist systems.

Furthermore, with the improvement of the accuracy of various environmental sensors, such as Radars and cameras, used in the active system, technologies using some functions of the active system have been developed to improve the performance and reliability of the passive system.

The airbag serves to reduce or prevent injury by mitigating impact, which is applied to a passenger, by appropriate inflation of an airbag cushion in the event of a vehicle accident, and a plurality of airbags may be installed around the passenger to be inflated and deployed in various forms.

That is, in addition to front airbags deployed in front of a driver's seat and a passenger seat, curtain airbags and side airbags that are deployed on the lateral side of the passenger to protect the passenger, and knee airbags for protecting the passenger's knee, and the like, may be provided.

The inflation behavior of such airbags plays a very important role in ensuring the safety of passengers, and the aforementioned airbags are properly inflated and deployed according to a collision direction to protect the passengers safely.

Meanwhile, recently, there have been developed autonomous vehicles that move by themselves even though drivers do not drive the vehicles.

The autonomous vehicle uses advanced sensors and high-performance graphic processing devices, which can recognize surrounding objects, to detect a situation of each device provided in the vehicle and situations around the vehicle, and travels by controlling the driving of each device provided in the vehicle according to the detection result.

Such advanced sensors measure a distance between objects like humans, detect danger, and help a driver to see all areas without blind spots. Furthermore, the graphic processing devices recognize surrounding environments of the vehicle through multiple cameras, analyzes images captured by the cameras, and help the vehicle to travel safely.

For example, the autonomous vehicle may be provided with a LiDAR device, a sound wave device, a 3D camera, a radar device, and the like.

In the autonomous vehicle configured in this way, as a driver does not need to drive the vehicle, the space inside the vehicle changes from a space for driving to a space for rest, so that all the seats including a driver's seat rotate freely and an angle of a backrest is adjusted to a horizontal state by a tilting operation.

The background art of the present disclosure is disclosed in Korean Patent No. 1655569 (published on Sep. 8, 2016 and entitled "Method and System for Protecting Passenger in Vehicle").

SUMMARY

Meanwhile, examples of driver assistance devices using in-vehicle images include safety convenience devices for driving negligence, drowsiness, and flickering, and user infotainment devices for face ID and gesture recognition. However, such assistance devices operate independently of passenger safety devices in the event of accidents.

Furthermore, when a collision accident occurs in a state in which the seated pose of a passenger is freely changed and the severity and mode of a collision are determined only by a collision signal, if an airbag is deployed regardless of passenger information on the position and pose of the passenger, there is a problem in that the passenger may not be safely protected.

Various embodiments are directed to providing an apparatus for protecting a passenger in a vehicle and a control method thereof, which recognize the type and position of a passenger by processing interior images of the vehicle based on deep learning, optimize an operation mode of an active seat belt and deployment time points of airbags according to the type and position of the passenger from the time point at which a collision is predicted, and operate the airbags.

An apparatus for protecting a passenger in a vehicle in accordance with the present disclosure may include: a collision detection unit that detects a predicted collision state and a collision state of a vehicle; a seat belt driving unit that adjusts tension of a seat belt according to an operation mode; an airbag driving unit that deploys each of a plurality of airbags according to a driving signal; a capturing unit that captures images of an interior of the vehicle; an image processing unit that extracts passenger information by processing an image, which is inputted from the capturing unit, based on deep learning; and a control unit that recognizes a passenger type and a seating position on the basis of the passenger information extracted by the image processing unit, operates the seat belt driving unit by setting the operation mode on the basis of the seating position when the predicted collision state is inputted from the collision detection unit, adjusts deployment time points of the plurality of airbags according to the collision state, an initial passenger position, the passenger type, and the seating position, and outputs the driving signal to the airbag driving unit.

In the present disclosure, the passenger information may include a size learned according to a type of a passenger, a size of a bounding box in which the passenger is detected, a pose learned according to a seated state of the passenger, and coordinates of skeleton key points according to the seated state of the passenger.

In the present disclosure, the control unit may include: a passenger type recognition section that recognizes the passenger type based on the size according to the type of the passenger and the size of the bounding box; a seating position recognition section that recognizes the seating position of the passenger based on the pose and the coordinates according to the seated state of the passenger; a seat belt operation determination section that receives the predicted collision state from the collision detection unit, and operates the seat belt driving unit by differently setting the operation mode of the seat belt according to the seating position of the passenger when a collision is predicted; a collision type determination section that receives the collision state from the collision detection unit, and determines a collision type; and an airbag deployment determination section that determines the deployment time points of the plurality of airbags according to the collision type based on the initial passenger position, the passenger type, and the seating position received from the passenger type recognition section and the seating position recognition section, and outputs the driving signal.

In the present disclosure, the passenger type may be one of large, medium, and small.

In the present disclosure, the pose may be one of slouching, upright, normal, left, and right.

In the present disclosure, when the seating position of the passenger is biased forward, the airbag deployment determination section may deploy a front airbag at low pressure and delay secondary deployment thereof.

In the present disclosure, when the passenger type is small and the collision type is a high-speed collision, the airbag deployment determination section may delay secondary deployment of the front airbag.

In the present disclosure, when the passenger type is large and the collision type is a low-speed collision, the airbag deployment determination section may deploy the front airbag at high pressure.

In the present disclosure, when the collision type is a side collision and the seating position of the passenger is close to a window side, the airbag deployment determination section may deploy a curtain airbag at the time of the collision.

In the present disclosure, the apparatus may further include a recording storage unit that stores a processing state of the control unit within a set time before and after the time point of a collision according to the collision state.

In the present disclosure, the processing state of the control unit may include one or more of the passenger type, the seating position, wearing or non-wearing of a seat belt, and a snap image of a captured image.

A control method of an apparatus for protecting a passenger in a vehicle in accordance with the present disclosure may include: a step in which a control unit receives, from an image processing unit, passenger information obtained by processing interior images of a vehicle based on deep learning; a step in which the control unit recognizes a passenger type and a seating position on the basis of the received passenger information; a step in which the control unit operates a seat belt driving unit by setting an operation mode on the basis of the seating position when a predicted collision state is inputted from a collision detection unit; a step in which the control unit determines a collision type when a collision state is inputted; and a step in which the control unit adjusts deployment time points of a plurality of airbags according to an initial passenger position, the passenger type, and the seating position according to the collision type, and outputs a driving signal to an airbag driving unit.

In the present disclosure, the passenger information may include a size learned according to a type of a passenger, a size of a bounding box in which the passenger is detected, a pose learned according to a seated state of the passenger, and coordinates of skeleton key points according to the seated state of the passenger.

In the present disclosure, in the step of recognizing the passenger type and the seating position, the control unit may recognize the passenger type based on the size according to the type of the passenger and the size of the bounding box.

In the present disclosure, in the step of recognizing the passenger type and the seating position, the control unit may recognize the seating position of the passenger based on the pose and the coordinates according to the seated state of the passenger.

In the present disclosure, in the step of operating the seat belt driving unit, the control unit may receive a predicted collision state from the collision detection unit, and operate the seat belt driving unit by differently setting an operation mode of a seat belt according to the seating position of the passenger when a collision is predicted.

In the present disclosure, the passenger type may be one of large, medium, and small.

In the present disclosure, the pose may be one of slouching, upright, normal, left, and right.

In the present disclosure, in the step of adjusting the deployment time points of the airbags, when the seating position of the passenger is biased forward, the control unit may deploy a front airbag at low pressure and delays secondary deployment thereof.

In the present disclosure, in the step of adjusting the deployment time points of the airbags, when the passenger type is small and the collision type is a high-speed collision, the control unit may delay secondary deployment of the front airbag.

In the present disclosure, in the step of adjusting the deployment time points of the airbags, when the passenger type is large and the collision type is a low-speed collision, the control unit may deploy the front airbag at high pressure.

In the present disclosure, in the step of adjusting the deployment time points of the airbags, when the collision type is a side collision and the seating position of the passenger is close to a window side, the control unit may deploy a curtain airbag at the time of the collision.

In the present disclosure, the method may further include a step in which the control unit stores, in a recording storage unit, a processing state within a set time before and after the time point of a collision according to the collision state.

In the present disclosure, the processing state may include one or more of the passenger type, the seating position, wearing or non-wearing of a seat belt, and a snap image of a captured image.

The apparatus for protecting a passenger in a vehicle and the control method thereof in accordance with the present disclosure can recognize the type and position of a passenger by processing interior images of the vehicle based on deep learning, optimize an operation mode of an active seat belt and deployment time points of airbags according to the type and position of the passenger from the time point at which a collision is predicted, and operate the airbags, thereby stably protecting the passenger by not only correcting a pre-collision pose according to the seating position of the passenger, but also optimizing the deployment time points of the airbags according to the type and the seating position of the passenger.

Furthermore, according to the present disclosure, it is possible to minimize malfunction due to misrecognition by recognizing the type of the passenger based on the size of the passenger and the size of the bounding box and recognizing the seating position based on the pose and coordinates of the passenger.

DETAILED DESCRIPTION OF THE ILLUSTRATED EMBODIMENTS

Figure 1:
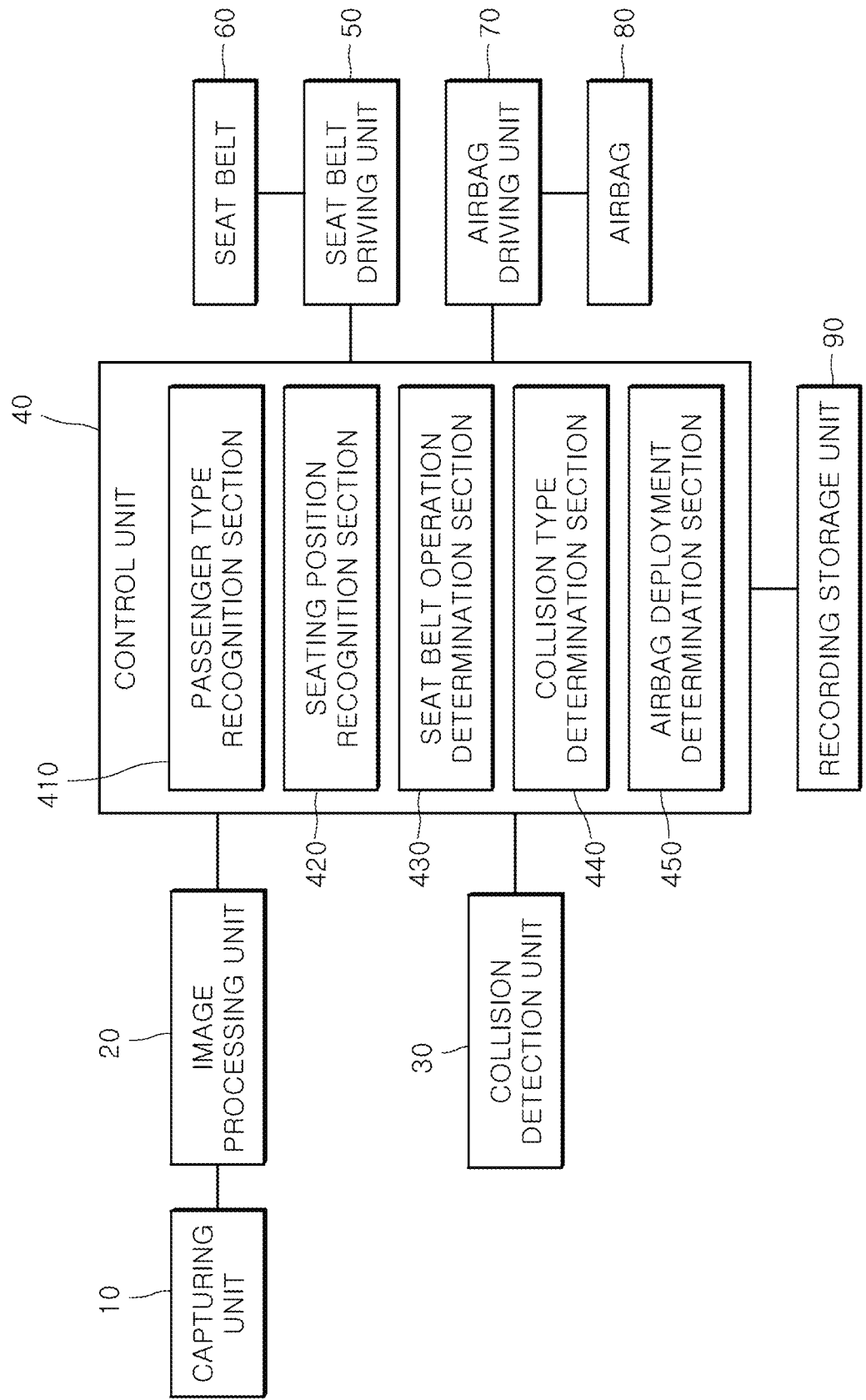
FIG. 1 is a block configuration diagram illustrating an apparatus for protecting a passenger in a vehicle in accordance with an embodiment of the present disclosure.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an apparatus for protecting a passenger in a vehicle and a control method thereof in accordance with the present disclosure will be described with reference to the accompanying drawings. In this process, the thickness of lines or the sizes of elements illustrated in the drawings may be exaggerated for the purpose of clarity and convenience of explanation. Furthermore, terms to be described later are terms defined in consideration of functions in the present disclosure and may be changed according to the intention of a user or an operator, or practice. Accordingly, such terms should be defined based on the disclosure over the present specification.

Figure 2:
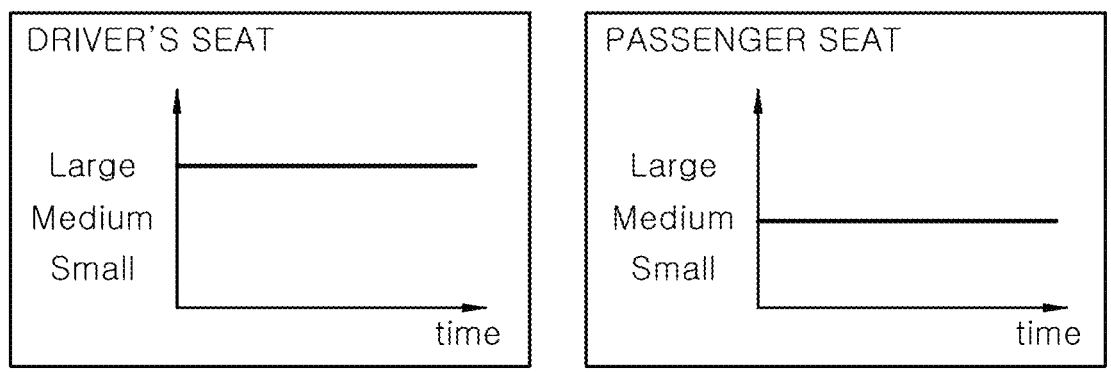
FIG. 2 is an exemplary diagram illustrating sizes for recognizing a passenger type in the apparatus for protecting a passenger in a vehicle in accordance with an embodiment of the present disclosure.
Figure 3:
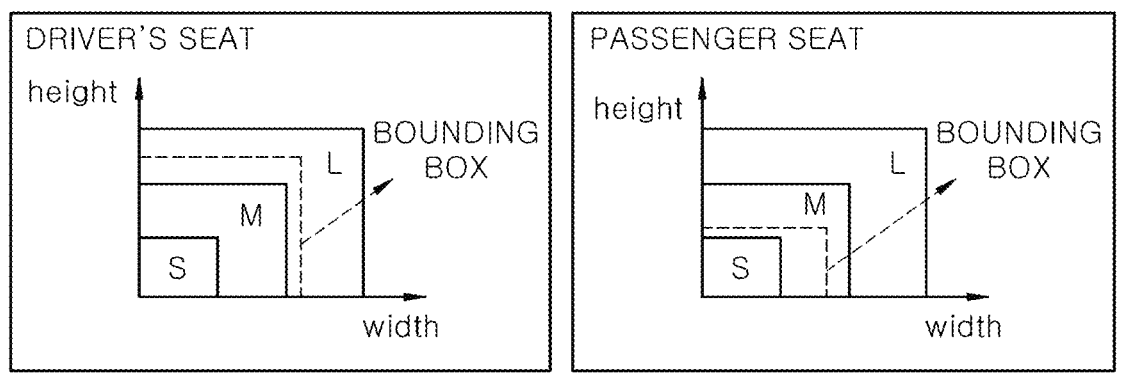
FIG. 3 is an exemplary diagram illustrating sizes of bounding boxes for recognizing the passenger type in the apparatus for protecting a passenger in a vehicle in accordance with an embodiment of the present disclosure.
Figure 4:
FIG. 4 is an exemplary diagram illustrating coordinates according to a seated state of a passenger in the apparatus for protecting a passenger in a vehicle in accordance with an embodiment of the present disclosure.
Figure 4:
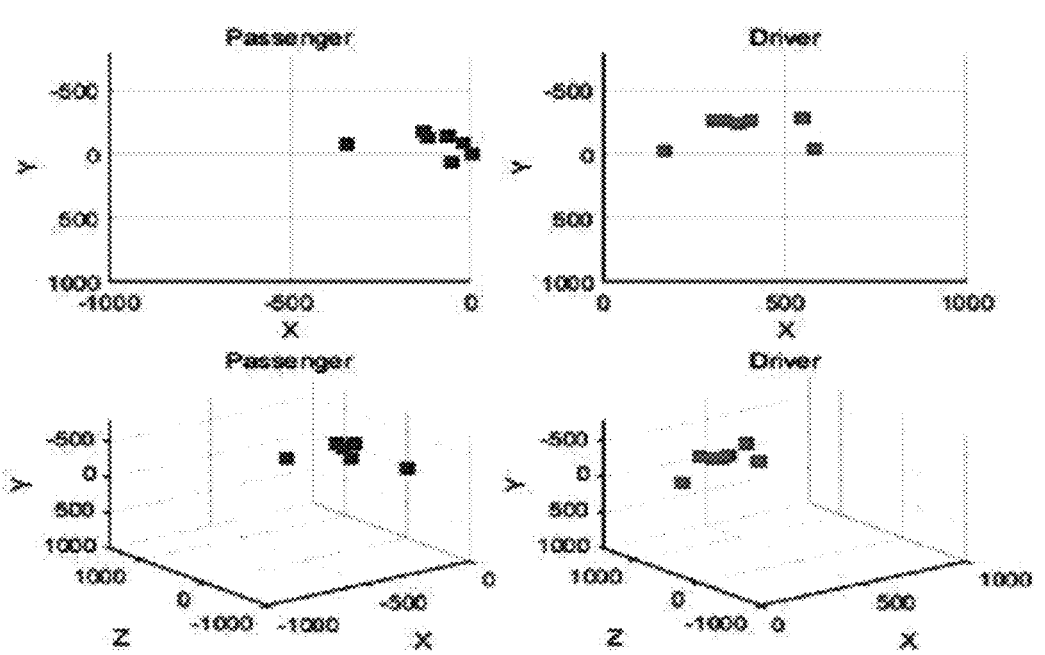
Figure 5:
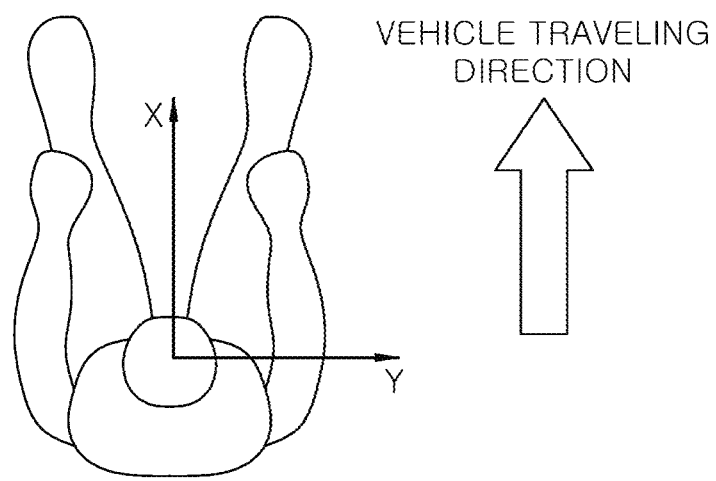
FIG. 5 is an exemplary diagram illustrating a seating position of a passenger in the apparatus for protecting a passenger in a vehicle in accordance with an embodiment of the present disclosure.
Figure 5:
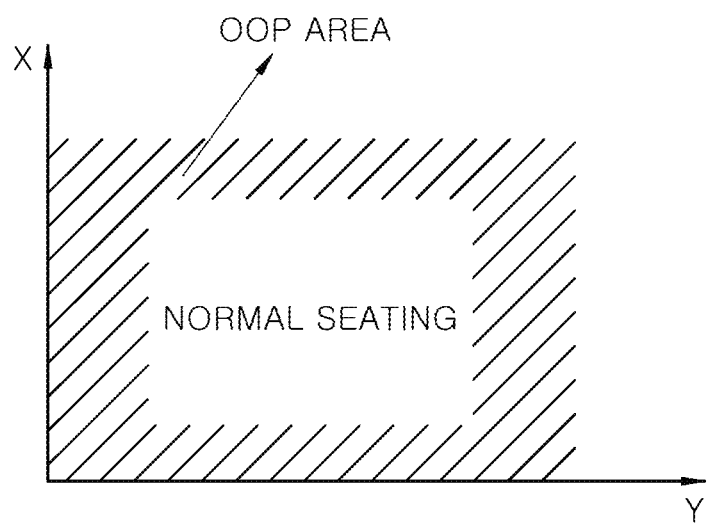

FIG. 1 is a block configuration diagram illustrating an apparatus for protecting a passenger in a vehicle in accordance with an embodiment of the present disclosure, FIG. 2 is an exemplary diagram illustrating sizes for recognizing a passenger type in the apparatus for protecting a passenger in a vehicle in accordance with an embodiment of the present disclosure, and FIG. 3 is an exemplary diagram illustrating sizes of bounding boxes for recognizing the passenger type in the apparatus for protecting a passenger in a vehicle in accordance with an embodiment of the present disclosure. FIG. 4 is an exemplary diagram illustrating coordinates according to a seated state of a passenger in the apparatus for protecting a passenger in a vehicle in accordance with an embodiment of the present disclosure, and FIG. 5 is an exemplary diagram illustrating a seating position of a passenger in the apparatus for protecting a passenger in a vehicle in accordance with an embodiment of the present disclosure.

As illustrated in FIG. 1, the apparatus for protecting a passenger in a vehicle in accordance with an embodiment of the present disclosure may include a collision detection unit 30, a seat belt driving unit 50, an airbag driving unit 70, a capturing unit 10, an image processing unit 20, a control unit 40, and a recording storage unit 90.

The collision detection unit 30 may detect a predicted collision state and a collision state of a vehicle through a plurality of sensors and cameras installed on the front or side of the vehicle, and provide the detection result to the control unit 40.

The seat belt driving unit 50 may correct a pose of a passenger before a collision by adjusting the tensile strength and the operation time point of a seat belt 60 according to an operation mode.

The airbag driving unit 70 may differently drive the deployment time points and pressure of a plurality of airbags 80, such as a front airbag, a side airbag, and a curtain airbag, according to a driving signal inputted from the control unit 40.

The capturing unit 10 may capture images of the interior of the vehicle and output the captured images to recognize passengers in a driver's seat and a passenger seat.

The image processing unit 20 may extract passenger information by processing the images, which are inputted from the capturing unit 10, based on deep learning.

Here, the image processing unit 20 may extract the passenger information including a size learned according to a type of a passenger, a size of a bounding box in which the passenger is detected, and a pose learned according to a seated state of the passenger, and coordinates of skeleton key points according to the seated state of the passenger.

The control unit 40 may recognize a passenger type and a seating position on the basis of the passenger information extracted by the image processing unit 20, operate the seat belt driving unit 50 by setting the operation mode on the basis of the seating position when the predicted collision state is inputted from the collision detection unit 30, adjust the deployment time points of the plurality of airbags 80 according to the collision state, the passenger type, and the seating position, and then output the driving signal to the airbag driving unit 70.

The control unit 40 may include a passenger type recognition section 410, a seating position recognition section 420, a seat belt operation determination section 430, a collision type determination section 440, and an airbag deployment determination section 450.

The passenger type recognition section 410 may recognize the passenger type based on the size according to the type of the passenger and the size of the bounding box from the passenger information extracted by the image processing unit 20.

Here, the passenger type recognition section 410 may recognize the passenger type based on the sizes of passengers in the driver's seat and the passenger seat which are extracted by the image processing unit 20 through learning based on deep learning according to the passenger type, as illustrated in FIG. 2, and the sizes of bounding boxes which are extracted by the image processing unit 20 and in which the heights and widths of the passengers in the driver's seat and the passenger seat are set, as illustrated in FIG. 3.

For example, in such a case, when the size of the passenger and the size of the bounding box are determined to be different from each other, the passenger type recognition section 410 may use a larger size to recognize the passenger type.

As described above, the passenger type recognition section 410 may determine the size of the passenger and the size of the bounding box, and recognize the passenger type as one of large, medium, and small.

The seating position recognition section 420 may recognize the seating position of the passenger based on the pose and the coordinates according to the seated state of the passenger.

Here, the seating position recognition section 420 may receive, from the image processing unit 20, one of slouching, upright, normal, left, and right as the pose of the passenger extracted through learning based on the deep learning according to the seated state of the passenger, and receive, from the image processing unit 20, 3D coordinates of the skeleton key points according to the seated state of the passenger as illustrated in FIG. 4.

In this way, based on the pose and coordinates according to the seated state of the passenger, as illustrated in FIG. 5, the seating position recognition section 420 may recognize the seating position of the passenger as coordinates in the traveling direction of the vehicle, and determine whether the seating position is normal seating, or is biased forward, left, or right in an area (OOP area) deviating from the normal seating.

The seat belt operation determination section 430 may receive the predicted collision state from the collision detection unit 30, and operate the seat belt driving unit 50 by differently setting the operation mode of the seat belt 60 according to the seating position of the passenger when a collision is predicted, and correct the pose of the passenger.

For example, depending on the operation mode, strong tension may be initially applied to the seating position and then the tension may be gradually decreased, or tension may be gradually increased initially and then strong tension may be applied thereto after a set time point.

The collision type determination section 440 may receive the collision state from the collision detection unit 30, and determine a collision type.

For example, the collision type determination section 440 may determine the collision type as a forward collision, a side collision, a rollover, and the like depending on the collision state.

The airbag deployment determination section 450 may determine the deployment time points of the plurality of airbags 80 according to the collision type based on an initial passenger position, the passenger type, and the seating position received from the passenger type recognition section 410 and the seating position recognition section 420, and output the driving signal.

Here, when the seating position of the passenger is biased forward, the airbag deployment determination section 450 outputs the driving signal to deploy the front airbag at low pressure and delay secondary deployment thereof.

Furthermore, when the passenger type is small and the collision type is a high-speed collision, the airbag deployment determination section 450 may delay the secondary deployment of the front airbag. When the passenger type is large and the collision type is a low-speed collision, the airbag deployment determination section 450 may deploy the front airbag at high pressure. When the collision type is a side collision and the seating position of the passenger is close to a window side, the airbag deployment determination section 450 may deploy the curtain airbag at the time of the collision.

The recording storage unit 90 may store a processing state including one or more of the passenger type, the seating position, the wearing or non-wearing of a seat belt, and the snap image of a captured image, which are processed by the control unit 40, within a set time before and after the time point of a collision according to the collision state.

As described above, the apparatus for protecting a passenger in a vehicle in accordance with the present disclosure can recognize the type and position of a passenger by processing interior images of the vehicle based on deep learning, optimize an operation mode of the active seat belt and the deployment time points of the airbags according to the type and position of the passenger from the time point at which a collision is predicted, and operate the airbags, thereby safely protecting the passenger by not only correcting a pre-collision pose according to the seating position of the passenger, but also optimizing the deployment time points of the airbags according to the type and the seating position of the passenger. In addition, the apparatus can minimize malfunction due to misrecognition by recognizing the type of the passenger based on the size of the passenger and the size of the bounding box and recognizing the seating position based on the pose and coordinates of the passenger.

Figure 6:
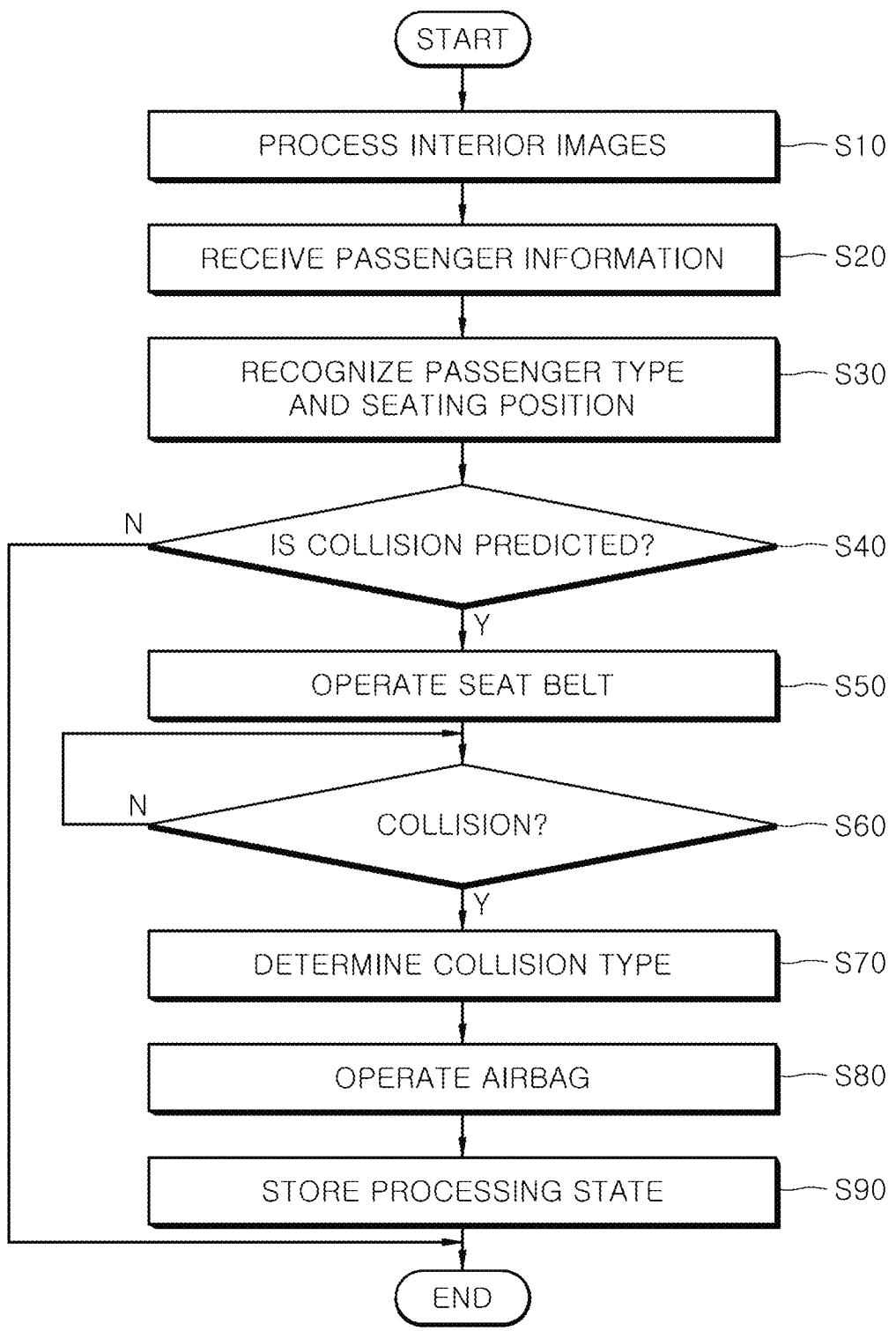
FIG. 6 is a flowchart for explaining a control method of the apparatus for protecting a passenger in a vehicle in accordance with an embodiment of the present disclosure.

FIG. 6 is a flowchart for explaining a control method of the apparatus for protecting a passenger in a vehicle in accordance with an embodiment of the present disclosure.

Referring to FIG. 6, in the control method of the apparatus for protecting a passenger in a vehicle in accordance with an embodiment of the present disclosure, first, the image processing unit 20 extracts learned passenger information by processing interior images of the vehicle, which are obtained by capturing images of the driver's seat and the passenger seat inside the vehicle through the capturing unit 10, based on deep learning (S10).

The passenger information may include a size learned according to a type of a passenger, a size of a bounding box in which the passenger is detected, and a pose learned according to a seated state of the passenger, and coordinates of skeleton key points according to the seated state of a passenger.

The control unit 40 receives the passenger information extracted by processing the interior images in step S10 (S20).

After receiving the passenger information in step S20, the control unit 40 recognizes a passenger type and a seating position on the basis of the passenger information (S30).

Here, the control unit 40 may recognize the passenger type based on the sizes of passengers in the driver's seat and the passenger seat which are extracted by the image processing unit 20 through learning based on deep learning according to the type of the passenger, as illustrated in FIG. 2, and the sizes of bounding boxes which are extracted by the image processing unit 20 and in which the heights and widths of the passengers in the driver's seat and the passenger seat are set as illustrated in FIG. 3.

For example, at this time, when the size of the passenger and the size of the bounding box are determined to be different from each other, the control unit 40 may use a larger size to recognize the passenger type.

In this way, the control unit 40 may determine the size of the passenger and the size of the bounding box, and recognize the passenger type as one of large, medium, and small.

Furthermore, the control unit 40 may receive, from the image processing unit 20, one of slouching, upright, normal, left, and right as the pose of the passenger extracted through learning based on the deep learning according to the seated state of the passenger, and receive, from the image processing unit 20, 3D coordinates of the skeleton key points according to the seated state of the passenger as illustrated in FIG. 4, thereby recognizing the seated position of the passenger.

In this way, based on the pose and coordinates according to the seated state of the passenger, as illustrated in FIG. 5, the control unit 40 may recognize the seating position of the passenger as coordinates in the traveling direction of the vehicle, and determine whether the seating position is normal seating, or is biased forward, left, or right in an area (OOP area) deviating from the normal seating.

After recognizing the passenger type and the seating position in step S30, the control unit 40 receives a predicted collision state from the collision detection unit 30 and determines whether a collision is predicted (S40).

When the determination result in step S40 indicates that the collision is predicted, the control unit 40 operates the seat belt driving unit 50 by setting an operation mode on the basis of the seating position, corrects the pose of the passenger by adjusting the tension of the seat belt 60 (S50).

After driving the seat belt 60 in step S50, the control unit 40 receives a collision state and determines whether a collision has occurred (S60).

When the determination result in step S60 indicates that the collision has occurred, the control unit 40 determines a collision type (S70).

For example, the control unit 40 may determine the collision type as a forward collision, a side collision, a rollover, and the like depending on the collision state.

After determining the collision type in step S70, the control unit 40 adjusts the deployment time points of the plurality of airbags 80 according to an initial passenger position, the passenger type, and the seating position, and output a driving signal to the airbag driving unit 70 (S80).

Here, when the seating position of the passenger is biased forward, the control unit 40 outputs the driving signal to deploy the front airbag at low pressure and delay secondary deployment thereof.

Furthermore, when the passenger type is small and the collision type is a high-speed collision, the control unit 40 may delay the secondary deployment of the front airbag. When the passenger type is large and the collision type is a low-speed collision, the control unit 40 may deploy the front airbag at high pressure. When the collision type is a side collision and the seating position of the passenger is close to a window side, the control unit 40 may deploy the curtain airbag at the time of the collision.

After driving the airbag in step S80, the control unit 40 may store, in the recording storage unit 90, a processing state including one or more of the passenger type, the seating position, the wearing or non-wearing of a seat belt, and the snap image of a captured image, which are processed, within a set time before and after the time point of a collision (S90).

As described above, the control method of the apparatus for protecting a passenger in a vehicle in accordance with the present disclosure can recognize the type and position of a passenger by processing interior images of the vehicle based on deep learning, optimize an operation mode of the active seat belt and the deployment time points of the airbags according to the type and position of the passenger from the time point at which a collision is predicted, and operate the airbags, thereby stably protecting the passenger by not only correcting a pre-collision pose according to the seating position of the passenger, but also optimizing the deployment time points of the airbags according to the type and the seating position of the passenger. In addition, the control method can minimize malfunction due to misrecognition by recognizing the type of the passenger based on the size of the passenger and the size of the bounding box and recognizing the seating position based on the pose and coordinates of the passenger.

The implementations described in the present specification may be implemented with a method or process, an apparatus, a software program, a data stream or signal, for example. Although discussed only in the context of a single form of implementation (for example, discussed only as a method), the discussed features may also be implemented as other forms (for example, an apparatus or a program). The apparatus may be implemented with appropriate hardware, software, firmware and the like. The method may be implemented in an apparatus such as a processor generally referring to a processing device including a computer, a microprocessor, an integrated circuit, or a programmable logic device. The processor includes a communication device such as a computer, a cellular phone, a portable/personal digital assistant (PDA), and other devices that facilitate communication of information between end users.

Although the present disclosure has been described with reference to the embodiments illustrated in the drawings, the embodiments of the disclosure are for illustrative purposes only, and those skilled in the art will appreciate that various modifications and equivalent other embodiments are possible from the embodiments.

Thus, the true technical scope of the disclosure should be defined by the following claims.

What is claimed is:

1. An apparatus for protecting a passenger in a vehicle, the apparatus comprising:
    a collision detection unit that detects a predicted collision state and a collision state of a vehicle;
    a collision type determination section that receives the collision state from the collision detection unit, and determines a collision type;
    a seat belt driving unit that adjusts tension of a seat belt according to an operation mode;
    an airbag driving unit that deploys each of a plurality of airbags according to a driving signal;
    a capturing unit that captures images of an interior of the vehicle;

an image processing unit that extracts passenger information by processing an image, which is inputted from the capturing unit, based on deep learning; and
a control unit that recognizes a passenger type and a seating position based on the passenger information extracted by the image processing unit, operates the seat belt driving unit by setting the operation mode on the basis of the seating position when the predicted collision state is inputted from the collision detection unit, adjusts deployment time points of the plurality of airbags according to the collision type, an initial passenger position, the passenger type, and the seating position, and outputs the driving signal to the airbag driving unit.

2. The apparatus according to claim 1, wherein the passenger information includes a size learned according to a type of a passenger, a size of a bounding box in which the passenger is detected, a pose learned according to a seated state of the passenger, and coordinates of skeleton key points according to the seated state of the passenger.

3. The apparatus according to claim 2, wherein the control unit comprises:
a passenger type recognition section that recognizes the passenger type based on the size according to the type of the passenger and the size of the bounding box;
a seating position recognition section that recognizes the seating position of the passenger based on the pose and the coordinates according to the seated state of the passenger;
a seat belt operation determination section that receives the predicted collision state from the collision detection unit, and operates the seat belt driving unit by setting the operation mode of the seat belt according to the seating position of the passenger when a collision is predicted;
an airbag deployment determination section that determines the deployment time points of the plurality of airbags according to the collision type based on the initial passenger position, the passenger type, and the seating position received from the passenger type recognition section and the seating position recognition section, and outputs the driving signal.

4. The apparatus according to claim 3, wherein, when the seating position of the passenger is biased forward, the airbag deployment determination section deploys a front airbag at low pressure and delays secondary deployment thereof.

5. The apparatus according to claim 4, wherein, when the passenger type is small and the collision type is a high-speed collision, the airbag deployment determination section delays secondary deployment of the front airbag.

6. The apparatus according to claim 4, wherein, when the passenger type is large and the collision type is a low-speed collision, the airbag deployment determination section deploys the front airbag at high pressure.

7. The apparatus according to claim 3, wherein, when the collision type is a side collision and the seating position of the passenger is close to a window side, the airbag deployment determination section deploys a curtain airbag at the time of the collision.

8. The apparatus according to claim 1, further comprising:
a recording storage unit that stores a processing state of the control unit within a set time before and after the time point of a collision according to the collision state.

9. The apparatus according to claim 8, wherein the processing state of the control unit includes one or more of the passenger type, the seating position, wearing or non-wearing of a seat belt, and a snap image of a captured image.

10. A method for protecting a passenger in a vehicle, the method comprising:
a step in which a control unit receives, from an image processing unit, passenger information obtained by processing interior images of a vehicle based on deep learning;
a step in which the control unit recognizes a passenger type and a seating position based on the received passenger information;
a step in which the control unit operates a seat belt driving unit by setting an operation mode based on the seating position when a predicted collision state is inputted from a collision detection unit;
a step in which the control unit determines a collision type when a collision state is inputted; and
a step in which the control unit adjusts deployment time points of a plurality of airbags according to an initial passenger position, the passenger type, the seating position, and the collision type, and outputs a driving signal to an airbag driving unit.

11. The method according to claim 10, wherein the passenger information includes a size learned according to a type of a passenger, a size of a bounding box in which the passenger is detected, a pose learned according to a seated state of the passenger, and coordinates of skeleton key points according to the seated state of the passenger.

12. The method according to claim 11, wherein, in the step of recognizing the passenger type and the seating position, the control unit recognizes the passenger type based on the size according to the type of the passenger and the size of the bounding box.

13. The method according to claim 11, wherein, in the step of recognizing the passenger type and the seating position, the control unit recognizes the seating position of the passenger based on the pose and the coordinates according to the seated state of the passenger.

14. The method according to claim 10, wherein, in the step of operating the seat belt driving unit, the control unit receives a predicted collision state from a collision detection unit, and operates the seat belt driving unit by setting an operation mode of a seat belt according to the seating position of the passenger when a collision is predicted.

15. The method according to claim 10, wherein, in the step of adjusting the deployment time points of the airbags, when the seating position of the passenger is biased forward, the control unit deploys a front airbag at low pressure and delays secondary deployment thereof.

16. The method according to claim 15, wherein, in the step of adjusting the deployment time points of the airbags, when the passenger type is small and the collision type is a high-speed collision, the control unit delays secondary deployment of the front airbag.

17. The method according to claim 15, wherein, in the step of adjusting the deployment time points of the airbags, when the passenger type is large and the collision type is a low-speed collision, the control unit deploys the front airbag at high pressure.

18. The method according to claim 10, wherein, in the step of adjusting the deployment time points of the airbags, when the collision type is a side collision and the seating position of the passenger is close to a window side, the control unit deploys a curtain airbag at the time of the collision.

19. The method according to claim 10, further comprising:

a step in which the control unit stores, in a recording storage unit, a processing state within a set time before and after the time point of a collision according to the collision state.

20. The method according to claim 19, wherein the processing state includes one or more of the passenger type, the seating position, wearing or non-wearing of a seat belt, and a snap image of a captured image.

* * * * *